(12) United States Patent
Hall

(10) Patent No.: US 6,999,961 B2
(45) Date of Patent: Feb. 14, 2006

(54) METHOD OF AGGREGATING AND DISTRIBUTING INFORMAL AND FORMAL KNOWLEDGE USING SOFTWARE AGENTS

(76) Inventor: Mark Hall, 3005 S. Lamar Blvd., Suite 359, Austin, TX (US) 78704

( * ) Notice: Subject to any disclaimer, the term of this patent is extended or adjusted under 35 U.S.C. 154(b) by 792 days.

(21) Appl. No.: 09/938,971

(22) Filed: Aug. 24, 2001

(65) Prior Publication Data

US 2002/0049743 A1 Apr. 25, 2002

Related U.S. Application Data

(60) Provisional application No. 60/230,962, filed on Sep. 7, 2002.

(51) Int. Cl.
G06F 17/30 (2006.01)

(52) U.S. Cl. .............................. 707/10; 707/3
(58) Field of Classification Search ............... 707/1–10; 434/322; 705/40, 400
See application file for complete search history.

(56) References Cited

U.S. PATENT DOCUMENTS 6,250,930 B1 * 6/2001 Mintz ......................... 434/323
6,347,333 B1 * 2/2002 Eisendrath et al. ......... 709/217
2002/0059204 A1 * 5/2002 Harris
2002/0073086 A1 * 6/2002 Thompson et al.

OTHER PUBLICATIONS

"ed–x.com" Advertisement.
Adkins, Randy, "AFMC Knowledge Management." Presentation.
Berners–Lee, Tim, James Hendler, and Ora Lassila. "The Semantic Web." Scientific American. <http://www.sclam.com/2001/0501issue/0501berners–lee.html> Jul. 16, 2001.
"Complete eLearningSolution." Brochure. Digital E–Holdings. 2001.

* cited by examiner

Primary Examiner—Greta Robinson
Assistant Examiner—Debbie M. Le
(74) Attorney, Agent, or Firm—David W. Carstens; Carstens & Cahoon, LLP (57) ABSTRACT

The present invention relates to a method of knowledge management by aggregating and distributing educational content, informal knowledge, and related supplies or services to various clients. Based on an exchange based architecture, software agents are either remotely installed on the networks of content and learning resource providers or operate autonomously. At the command of the aggregator, the agents poll and collect requested content from the content and learning resource providers. After receiving the requested content, the aggregator distributes the collected content to a client website or browser application applying the rules and standards unique to each client end user.

25 Claims, 6 Drawing Sheets

METHOD OF AGGREGATING AND DISTRIBUTING INFORMAL AND FORMAL KNOWLEDGE USING SOFTWARE AGENTS

The present invention is a continuation-in-part of Provisional Ser. No. 60/230,962 filed on Sep. 7, 2000. The content of this application is incorporated herein by reference.

TECHNICAL FIELD OF THE INVENTION

The present invention relates to a method of knowledge management by controlling the aggregation or dissemination of information from numerous disparate sources including organizational databases of informal knowledge and databases of formal educational content and delivering such content to an end user in real time and "batch" modes of delivery. In addition to content, the method links the content to required or optional products that are useful to the end user.

BACKGROUND OF THE INVENTION

Knowledge management incorporates two distinct areas of information: formal knowledge (e.g., educational classes, courses, training, and certificate or degree programs) and informal knowledge (that which is accumulated within an organization or institution by its members—for instance, what is the best method sales support by an organization's staff)

Informal, or institutional knowledge, is an increasingly important asset to a variety of organizations. As employees grow older and retire, much of their experience regarding the daily operations of the organization are lost forever. As new employees join the organization, they must be trained and educated in these same operations the aggregation of informal knowledge into software-driven databases that may be accessible by users or user groups. For example, the military might experience a loss of important repair personnel during wartime. The use of informal knowledge (and formal knowledge such as an online training class) could rapidly provide additional personnel to assume the military's necessary tasks. The management of such informal knowledge can dramatically improve the effectiveness of organizations such as the military, corporations, and other institutions.

Formal knowledge, on the other hand, are educational and training opportunities such as classes, continuing education, training seminars, degrees and certificates as well as any database that contains pedagogically structured information. Online and distance learning is a increasingly important part of formal knowledge in the spectrum of knowledge management. For example, online learning promises to bring high quality educational services to anyone with a computer and a connection to the Internet. Educational opportunities are often out of reach for many because of their circumstances. For instance, a private in the military might be stationed on a base overseas. To further his education, classes may be taught at his base. But, if not, he may have to postpone furthering his education until his time in the military is over. A need exists for a method of bringing high quality education to that soldier.

The military also has an interest in bringing specific content to its soldiers. For example, educating an officer in tactics for a particular environment might be available from different and multiple databases located at several military academies. However, the officers in the field may not have time to travel to and attend seminars on these tactics. Instead, a need exists for a method to provide aggregated information from disparate sources regarding educational content and informal organizational knowledge, serialize this content and then deliver it to the appropriate personnel.

While military personnel have been used in this example, any individual may have the same needs. Also, many organizations face the need to have a centralized point to find the educational content and the supplies (e.g., textbooks, software, online libraries) that are needed to utilize or supplement that content.

SUMMARY OF THE INVENTION

The present invention relates to a method of aggregating and distributing educational content, organizational knowledge, and related supplies or services using software known as "agents" organized and orchestrated by a controlling software routine. Based on an exchange-based architecture, software agents are remotely installed on the servers of content providers. Some software agents operate autonomously but still managed by the controller software, without installation at the servers of various content providers. At the command of the controller, the agents poll and collect requested content from the content provider. Time sensitive information, for example course cost, prerequisites, instructor, and course availability, among other items, can be collected the user in real time. Data that describe institutional knowledge may also be collected in real time. After receiving the requested content from the agents, the controller distributes the collected content to a client, or group of clients. The information is sorted and selected by applying the rules and standards unique to each client end user or group of end users.

One unique aspect of this invention is to collect the information at a central point such as a a single web site aggregator, for example the web site located at www.edx.com. This type of site site will be generally referred to as the aggregator. The aggregator establishes numerous relationships with both content providers and learning resource providers. The aggregator may also have access to an organization's databases that store informal or institutional knowledge. The aggregator is accessed by the client software on the end user's computer through various wired or wireless gateways, such as the Internet or other private or public network. The controller software which is located on a the aggregator site's servers instructs remoteagents which are located on specific content provider's database and networkservers, or such agents that may operate autonomously to poll and collect requested data which is then returned to the aggregator for further processing and then on to the end user for interaction. The controller software may furthermore instruct autonomous agents to collect data from public sources (including web pages in HTML and XML formats) according to rules and standards requested by the end user. The aggregator then distributes the requested content to the requesting clients in a specified format. In this manner, informal and formal knowledge is aggregated by the aforesaid software agents, managed by controller software, and returned to the user or end user group for further interaction according to rules and standards.

BRIEF DESCRIPTION OF THE DRAWINGS

The accompanying drawings are incorporated into and form a part of the specification to provide illustrative examples of the present invention. The drawings together with their description serve to explain the principles of the invention. The drawings are only for purposes of illustrating preferred and alternate embodiments of how the invention can be made and used and are not to be construed as limiting the invention to only the illustrated and described examples.

Various advantages and features of the present invention will be apparent from a consideration of the accompanying drawings in which.

DETAILED DESCRIPTION OF THE DRAWINGS

Figure 1:
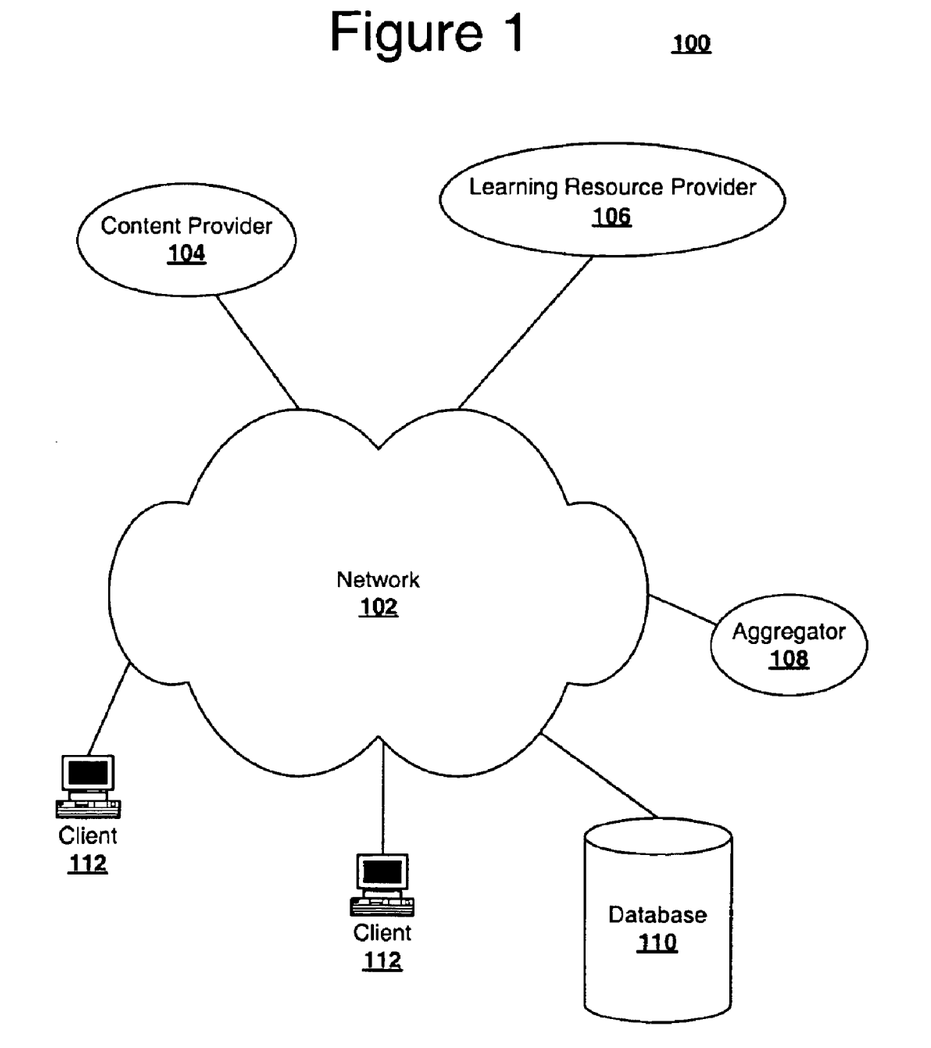
FIG. 1 is a diagram of a network in which the present invention may be implemented.

Turning to FIG. 1, a network diagram in which the present invention may be implemented is shown. FIG. 1 is a pictorial representation of a distributed data processing system. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a content provider 104 and learning resource provider 106 are connected to network 102. In the preferred embodiment of the present invention, content providers 104 might be universities, colleges, foundations, private providers, corporations or an organization's institutional (or informal) knowledge database. Learning resource providers 106 may include providers that offer online libraries, textbooks, e-content, software or hardware, or financial aid or counseling. The aggregator 108 is also connected to network 102 along with storage database 110. Clients 112 may be, for example, personal computers or network computers representing a student or corporate client networks with more than one individual client. For purposes of this application, a network computer is any computer coupled to a network, which receives a program or other application from another computer coupled to the network. Distributed data processing system 100 may also include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
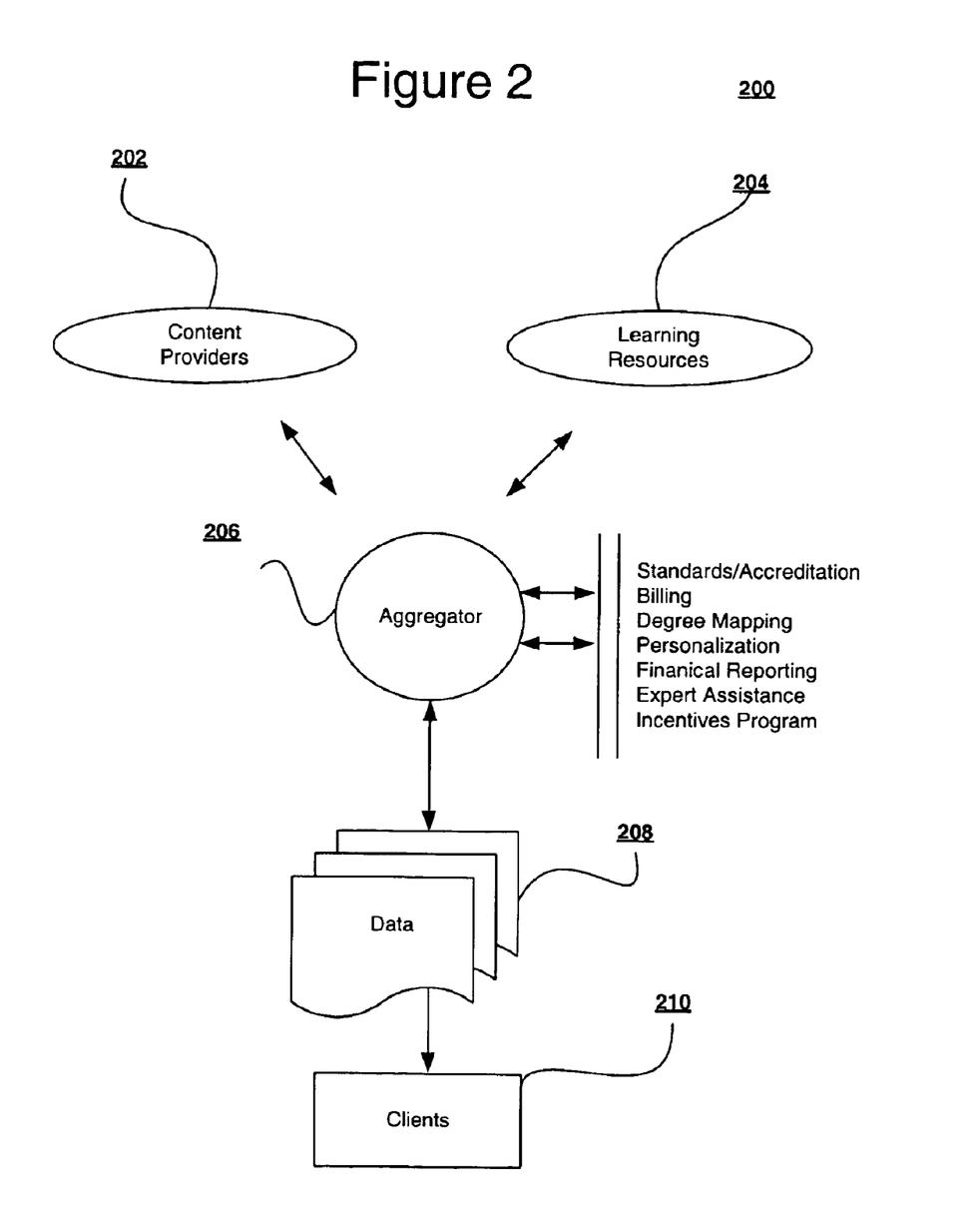
FIG. 2 is a chart depicting the educational exchange model disclosed herein.

FIG. 2 illustrates one embodiment of the computer architecture for the present invention. The aggregator 206 represents a link between content providers 202, learning resource vendors 204 and clients 208. Content providers 202 may be colleges, universities, foundations, private providers corporations, and organizations which provide downloadable content 208 for use by clients 210. Learning resource providers 204 may be textbook companies, software or hardware providers, and financial institutions which provide financial aid for clients 210. In the preferred embodiment, aggregator 206 is a service vendor which provides services to clients 210 seeking information and products pertaining to academic education. For example, aggregator 206 may provide clients 210 with information 208 and access to university curricula, degree plans, subjects, course schedules, textbooks, financial aid and academic or professional accreditation.

In alternative embodiments of the present invention, the aggregator 206 may take on numerous responsibilities and perform various functions. For example, if the client 210 is taking a distance learning program from a university that leads to a degree, he may want to transfer credits earned from a junior college to his present university. To accomplish this, the aggregator 206 can informally correlate the junior college courses to their equivalent courses offered by the university. It may also request the official transcript showing the junior college courses either from the client or that institution and formally request the transfer credits. This process might also be used to manage an employee's training record, an attorney's continuing legal education requirements or other similar data.

In a similar vein, the aggregator 206 can act as a credit facility. If the client 210 takes multiple distance learning courses from multiple providers, then the aggregator 206 can record those credits and provide a "transcript" for the client 210. As the client 210 searches the multiple providers 202, 204 for selections of either content products or services 208, the aggregator 206 can also accumulate ratings from those clients 210 as to the quality and value of those offerings.

Another unique aspect of the present invention is the incorporation of a rewards program. The aggregator 206 can offer rewards to the client 210 for selection of particular courses or products. For example, a client 210 may be given incentive to select a course from one content provider 202, 204 over another in the form of tuition discounts for that or future courses. A substantially identical course might be offered by two institutions where each institution may charge $1000 for the course. However, to persuade clients 210 to select one of the institutions, the rewards program might offer a 10% discount on a future course. The reward might also be in the form of points that are redeemable for free content 208 in the future. Alternatively, the client 210 may be offered one free course for every three paid for. The credit might also extend to the purchase of supplies. Likewise, a product vendor 204 might offer a $100 credit with the purchase of a computer that can be used toward the cost of tuition for a course.

The rewards program might also be extended to the content and product vendors 202, 204. The aggregator 206 may take a fixed percentage of any amount paid for either a course or a product. If a client 210 pays $1000 for a course, the content provider 202 may be required to pay the aggregator 206 five percent (5%) of the proceeds. In an attempt to motivate the provider 202, 204 to list with only the one aggregator, that aggregator 206 might offer a reduction in this percentage. Alternatively, in an attempt to appeal to a special content provider, the aggregator 206 might offer to not list any directly competitive courses for a period of time. Alternatively, the aggregator 206 might offer to not list directly competitive courses for a higher fee.

Another unique aspect of this invention is its ability to aggregate formal knowledge, such as online classes, training and degree programs, with informal, or institutional knowledge. By extracting such informal knowledge from the knowledge management databases established by an organization, the remote agent can supply an end user with the organization's preferred manner of conducting its operations. These informal learning opportunities can be mixed with formal learning opportunities to provide a spectrum of knowledge acquisition from disparate data sources for the benefit of the user or user group.

Figure 3:
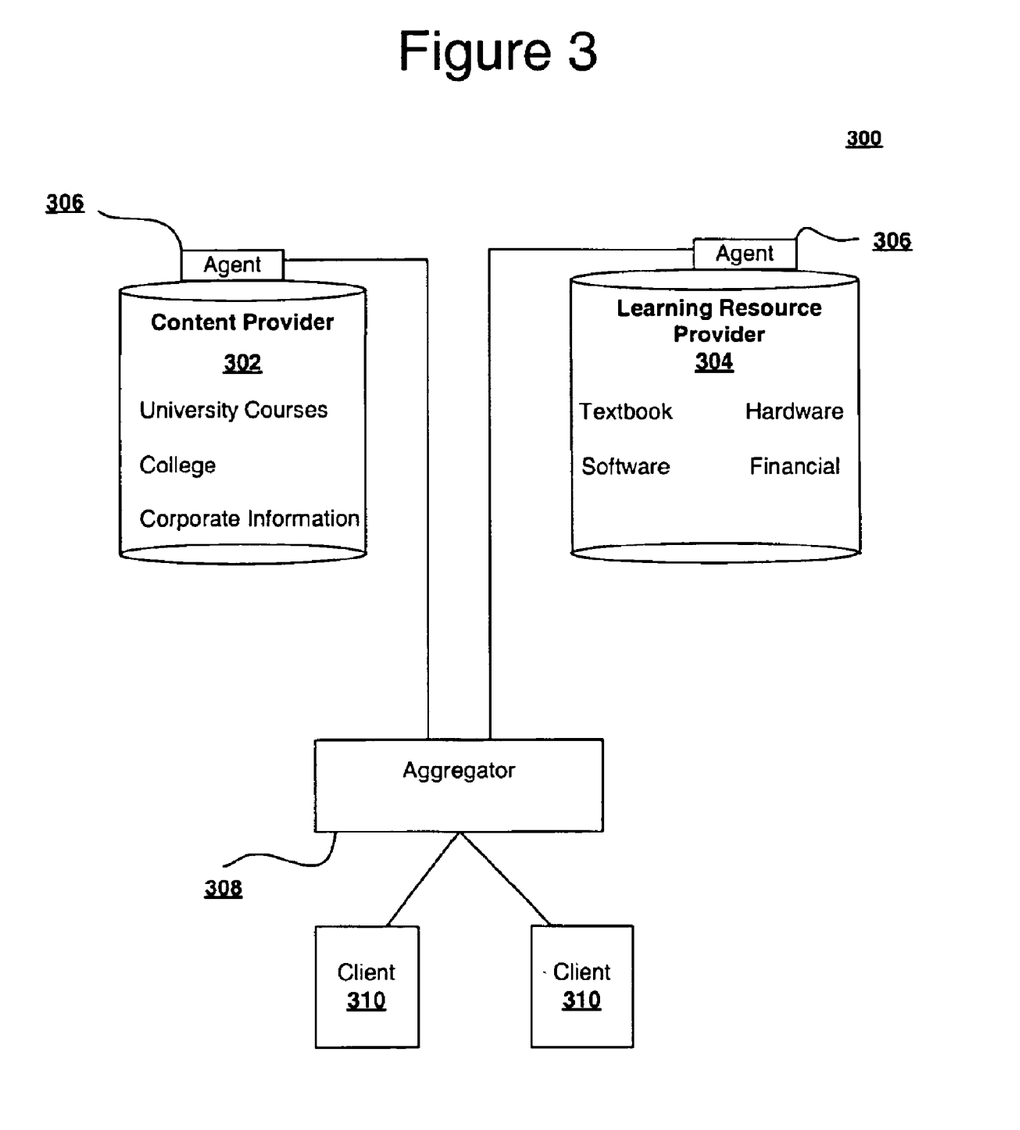
FIG. 3 is a diagram depicting an agent content aggregator as disclosed herein.

With reference to FIG. 3, the aggregator agent architecture 300 is depicted in further detail. Agent 306 is a proprietary software routine, such as the agent developed and owned by Digital E Holdings, Inc. of Austin, Tex., which is stored on the computer network composed of the databases, storage media, personal computers and servers of the content provider 302 and the learning resource provider 304. Agents can be classified as "remotely accessible" or "autonomous." Remotely accessible agents are non-intrusive software routines that can retrieve data from a variety of disparate databases according to the instructions of a software routine known as a "controller." Remotely accessible agents are also "bilingual" in that they can instruct a database on which the agent is placed to perform an instruction routine or complete some other requested task. The controller software generates a set of rules and standards for the agents to gather the information in a user request. Autonomous agents use the same set of rules and standards as the remotely accessible agents but are not placed within a third party database. Instead they retrieve data upon instruction from the controller and provide that data to the user after organization of the data by the controller. Upon receipt of search instructions from the aggregator 308, the agent 306 searches the network database and storage mediums of the content provider 302 and/or the learning resource provider 304 for the information requested by the aggregator 308. The agent search results are then transmitted to the aggregator 308 for further processing, which are then transmitted to the client 310 requesting the information.

Figure 4:
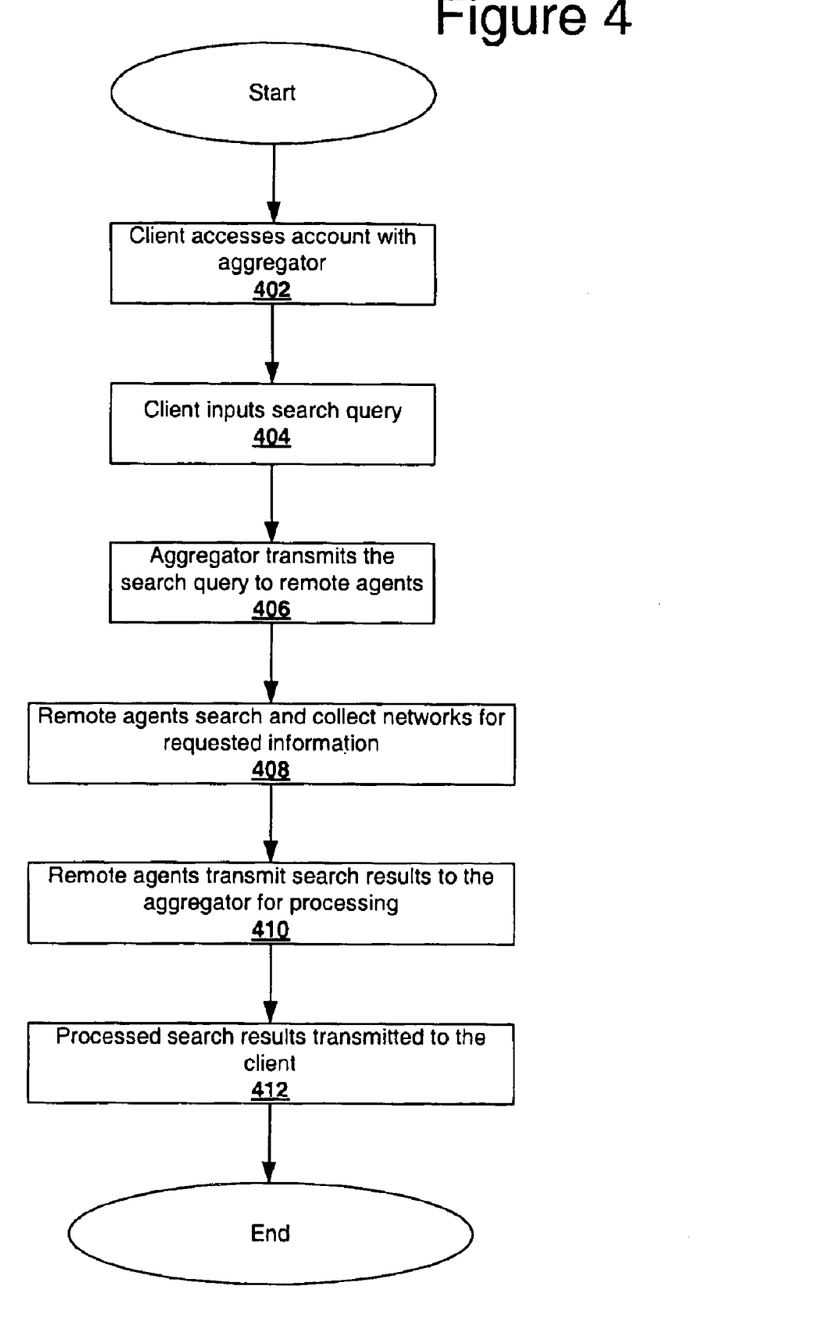
FIG. 4 is a flowchart representing the utilization of the educational exchange model disclosed herein.

Turning now to FIG. 4, a flowchart depicting the utilization of the present invention is disclosed. Initially, the client has established an account with the aggregator which includes the client's personal and billing information (Step 402). Access to the client's account is controlled by a password or security protocol as is known in the art. The account may also include a personal record of the client's credits and transcripts from each academic institution attended or accessed by the client. The client accesses his account with the aggregator and inputs a search query pertaining to information the client desires to find (Step 404). The aggregator transmits the search query to the remote agents (Step 406) located on the content provider and learning resource provider networks which then begin searching in real time for the requested information (Step 408). The agents transmit the results of the search query to the aggregator for processing using rules and standards as expressed by the end user or end user group. (Step 410). For instance, the aggregator may process the search results by analyzing and culling information which is not relevant to the query posed by the client and then transmitting the condensed information to the client (Step 412). Alternatively, the aggregator may not analyze the agent search results and simply transmits the search results on to the client for processing.

Figure 5:
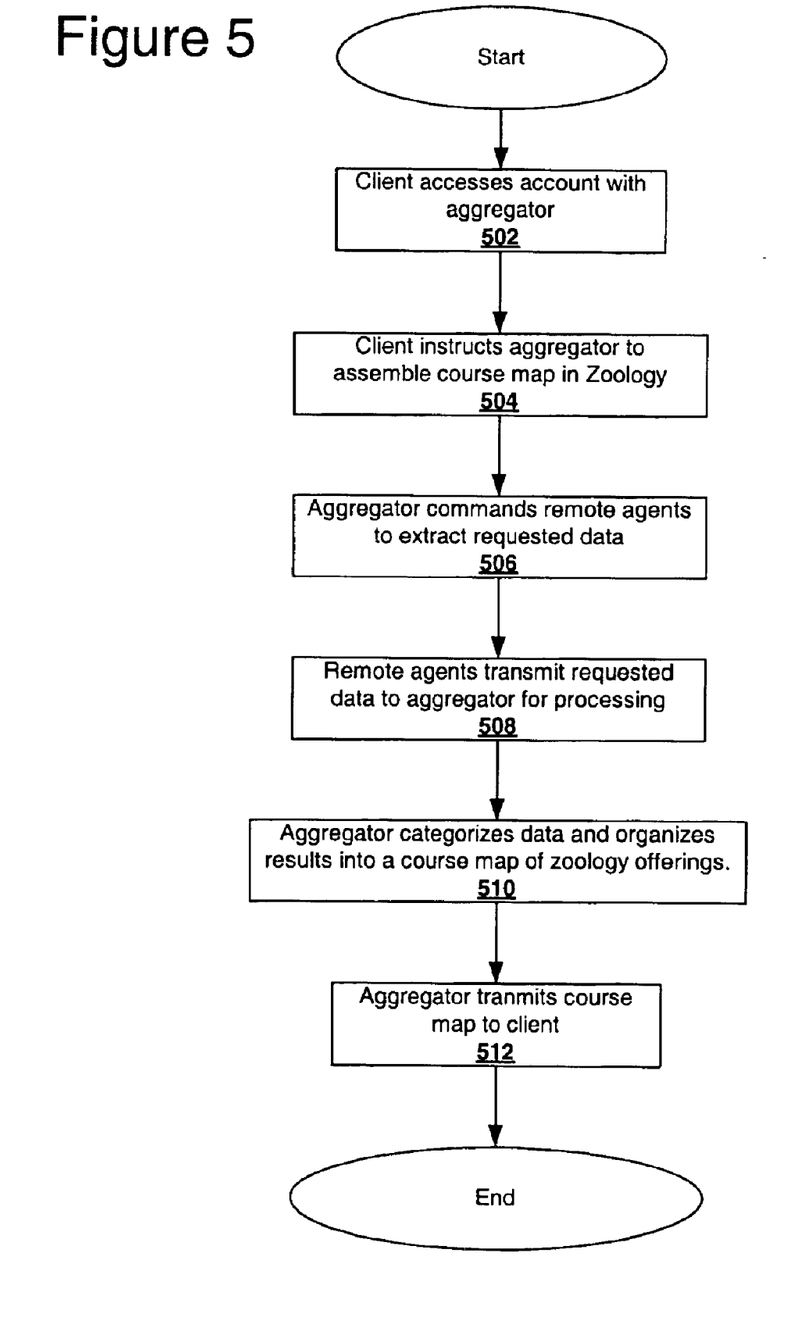
FIG. 5 depicts an alternative embodiment of the invention disclosed herein; and, FIG. 6 is a depiction of another alternative embodiment of the aggregator invention disclosed herein.

FIG. 5 is an alternative embodiment of the invention disclosed herein which allows the client to retrieve customized forms of information as specifically requested by the client. For example, the client may wish to view a degree plan or "course map" of the various online or distance learning courses he or she will need to complete in order to obtain a degree in zoology with a specialization in primates. Course content will have to be obtained from several institutions to provide the degree. Initially, the client accesses his or her account with the content aggregator (Step 502). Next, the client inputs the appropriate query or commands instructing the aggregator to assemble a course map of academic courses available from various academic content providers which are required for a zoology degree (Step 504). The aggregator transmits the appropriate commands to the remote agents located on various content provider databases and to autonomous agents located outside of such databases to search and retrieve information on zoology courses offered by each content provider (Step 506). After the software agents complete their search and collection of information and courses related to zoology at each content provider, the agents transmit the collected information to the aggregator for processing (Step 508). The aggregator processes the information by methods known in the art for categorizing and organizing electronic information according to a selected variable, such as course prerequisites, course availability, course title, course location, course length, course credit and course tuition cost (Step 510). This categorization and organizational analysis enables the client to create a degree plan selected from a variety of courses offered by different content providers and in effect, create a custom course map degree plan based on course offerings from a single or multiple content providers. The aggregator then transmits the processed information to the client which presents the courses the client will need to complete to receive a specialized degree in zoology (Step 512).

Figure 6:
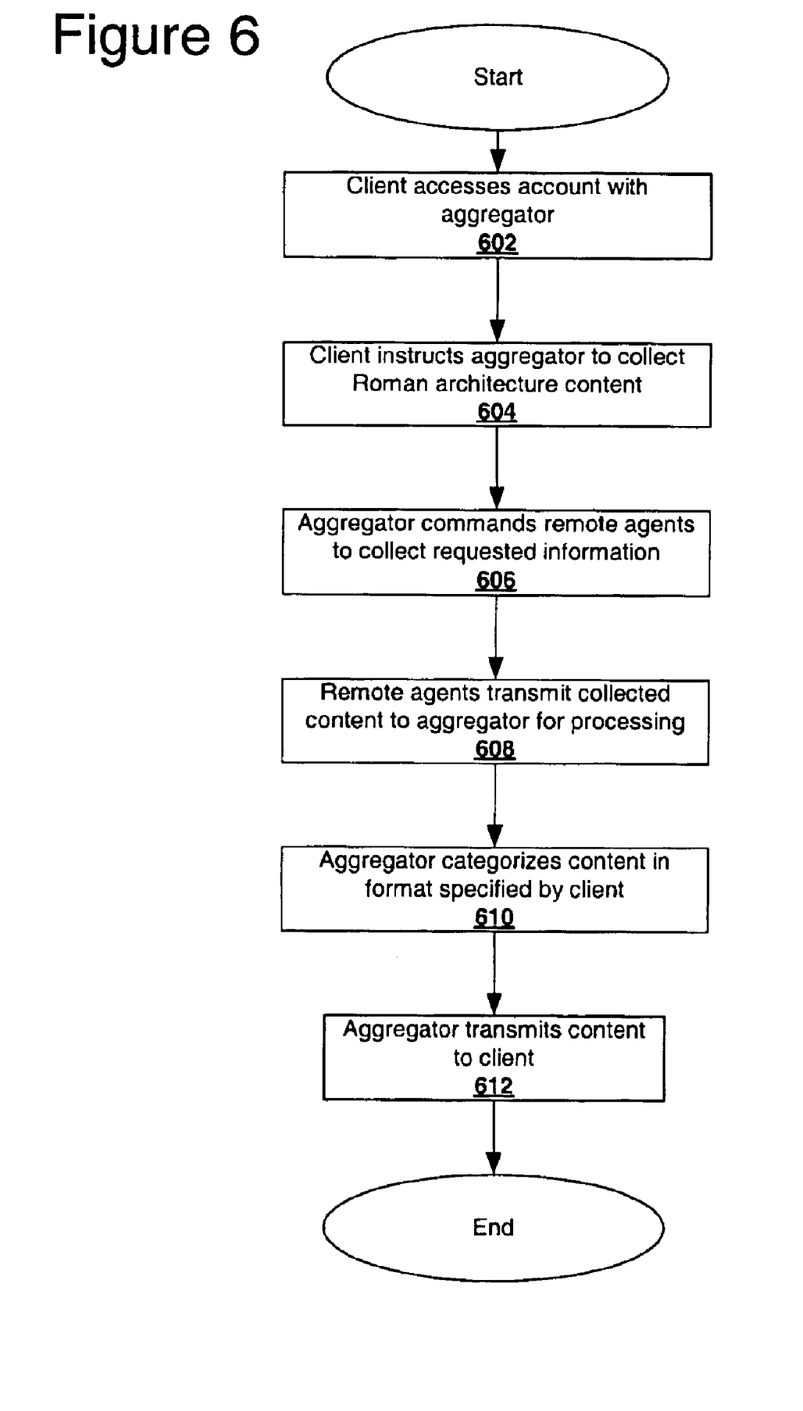

FIG. 6 is another example of an alternative embodiment of the present invention in which the client instructs the aggregator to locate and assemble specific subject content from a variety of networked content and learning resource providers. Once the client has accessed his or her account with the aggregator (Step 602), the client enters a query instructing the aggregator to collect information on a specific topic, such as roman architecture (Step 604). The aggregator transmits the query to the remote agents located on the content provider and learning resource provider networks and databases (Step 606). The remote agents poll and collect information on roman architecture from a variety of sources, including but not limited to, architectural design classes, architectural product suppliers, architectural historical associations, and other architectural databases and then transmit the collected content to the aggregator for processing (Step 608). The aggregator categorizes the content in the format specified by the client where, in this example, the client is provided with a list of various sources with content directed towards roman architecture which may include the blueprints of the coliseum from an archive, an online course on the impact of roman architecture in the development of civilization, and plastic model reproductions of roman columns or, perhaps, what a colleague within the user's organization may have recorded regarding roman architecture upon the organization's database. The aggregator can also sort through online educational content that can be accessed at a submodular level (for example, a chapter of a textbook in electronic format) to create content that, when added together, comprise a customized online course in roman architecture from various content providers for that particular user or user group. Textbooks, course content, graphical images, and other accessible data can be pulled from to create customized content. (Step 610). The aggregator then transmits the processed content to the client (Step 612).

The matters set forth in the foregoing description and accompanying drawings are offered by way of illustration only and not as limitations. Other applications and variations of the invention disclosed herein will become evident to those skilled in the art. The actual scope of the invention is intended to be defined in the following claims when viewed in the proper perspective based on the relevant prior art.

I claim:

1. A method of aggregating information content comprising:
    accessing a content aggregator;
    transmitting a search query to the content aggregator;
    transmitting the query from the content aggregator to a plurality of remote agents, wherein each of said agents is located on one of a plurality of distinct networks;
    searching each of said plurality of networks for content responsive to the query via its respective remote agent;
    transmitting a search result from each of said respective remote agents to the content aggregator;
    processing the plurality of search results into a processed information content via the aggregator, wherein said processing includes applying a rules and standard designated by a client, and
    transmitting said processed information content from said aggregator to said client.

2. The method of claim 1 wherein the plurality of distinct networks include learning resource provider and content provider computer networks.

3. The method of claim 1 wherein the content aggregator processes the plurality of search results by statistically weighting at least one variable based on an academic institution, content price, content credit, content subject, or content location.

4. The method of claim 1 wherein the content aggregator monitors academic credit acquired by the client.

5. The method of claim 1 wherein the content aggregator provides incentives to the client for purchasing content from at least one learning resource provider.

6. The method of claim 1 wherein the content aggregator receives a discount from a learning resource provider based on the amount of content received by the client.

7. The method of claim 1 wherein the content aggregator receives a discount from a content provider based on the amount of content received by the client.

8. The method of claim 1 wherein the client receives a discount from the aggregator based on the amount of content received by the client.

9. A system for aggregating information content comprising:
    means for accessing a content aggregator;
    means for transmitting a search query from a client to a content aggregator;
    means for transmitting the query from the content aggregator to a plurality of remote agents, wherein each of said agents is located on one of a plurality of distinct networks;
    means for searching each of said plurality of networks for content responsive to the query via its respective remote agent;
    means for each of said respective remote agents transmitting a search result to the content aggregator;
    means for processing the plurality of search results into a processed information content via the aggregator, wherein said processing means for applying a rules and standard selected by said client,
    means for transmitting said processed information content to said client.

10. The system of claim 9 further comprising means for processing the content by statistically weighting at least one variable based on an academic institution, content price, content credit, content subject, or content location.

11. A computer program product for aggregating information content comprising:
    first instructions for allowing a client to access a content aggregator;
    second instructions for transmitting a search query from said client to the content aggregator;
    third instructions for transmitting the query from the content aggregator to a plurality of remote agents, wherein each of said agents is located on one of a plurality of distinct networks;
    fourth instructions for searching a said plurality of networks for content responsive to the query via its respective remote agent;
    fifth instructions for transmitting a search result from each of said respective remote agents to the content aggregator;
    sixth instructions for processing the plurality of search results into a processed information content via the aggregator, wherein said processing includes applying a rules and standard unique to said client; and,
    seventh instructions for transmitting said processed information content to said client.

12. The computer program product of claim 11 wherein the instructions for processing the content by the aggregator include statistically weighting at least one variable based on an academic institution, content price, content credit, content subject, or content location.

13. The method of claim 1 wherein said search query comprises a customized form.

14. The method of claim 1 wherein said remote agents gather the content responsive to the query in accordance with rules and standards generated by a controller software.

15. The method of claim 14 wherein said remote agents are autonomous.

16. The method of claim 14 wherein said remote agents are remotely accessible by said aggregator.

17. The method of claim 16 wherein said remote agents are installed on said distinct networks.

18. The method of claim 1, wherein said processing further comprises the aggregator analyzing said results and culling information not relevant to the search query posed.

19. The method of claim 1, wherein said processing further comprises the aggregator categorizing said search results in a format specified by said client.

20. The method of claim 1, wherein said aggregator transmits the processed information to the client in a customized response form.

21. The method of claim 9, wherein said plurality of networks comprise learning resource provider and content provider computer networks.

22. The method of claim 9, wherein said search results comprise formal and informal knowledge.

23. The method of claim 9, wherein said remote agents gather the content responsive to the query in accordance with rules and standards generated by a controller software.

24. The method of claim 9, wherein each of said remote agents include an autonomous controller software program.

25. The method of claim 9, wherein each of said remote agents are remotely accessible by a controller software program installed on said aggregator.

* * * * *

UNITED STATES PATENT AND TRADEMARK OFFICE
CERTIFICATE OF CORRECTION

PATENT NO. : 6,999,961 B2 Page 1 of 1
APPLICATION NO. : 09/938971
DATED : February 14, 2006
INVENTOR(S) : Mark Hall

It is certified that error appears in the above-identified patent and that said Letters Patent is hereby corrected as shown below:

On the Cover Page: the filing date of the provisional application under "Related U.S. Application Data" is wrong. Please correct to show as follows:

-- (60) Provisional application No. 60/230,962, filed on Sep.7, 2000 --

Signed and Sealed this

Twenty-second Day of August, 2006

JON W. DUDAS
*Director of the United States Patent and Trademark Office*